United States Patent
Schuette et al.

(10) Patent No.: US 11,585,223 B2
(45) Date of Patent: Feb. 21, 2023

(54) GAS TURBINE BLADE ARRANGEMENT

(71) Applicant: MTU Aero Engines AG, Munich (DE)

(72) Inventors: Wilfried Schuette, Oberhaching-Furth (DE); Axel Stettner, Dachau (DE); Michael Junge, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/718,710

(22) Filed: Apr. 12, 2022

(65) Prior Publication Data
US 2022/0333488 A1  Oct. 20, 2022

(30) Foreign Application Priority Data

Apr. 19, 2021  (DE) .......................... 102021109844.0

(51) Int. Cl.
*F01D 5/14*  (2006.01)

(52) U.S. Cl.
CPC ........ *F01D 5/141* (2013.01); *F05D 2240/121* (2013.01); *F05D 2240/122* (2013.01); *F05D 2240/301* (2013.01); *F05D 2240/303* (2013.01); *F05D 2240/304* (2013.01); *F05D 2250/71* (2013.01)

(58) Field of Classification Search
CPC ............... F01D 5/141; F05D 2240/121; F05D 2240/122; F05D 2240/301; F05D 2240/303; F05D 2240/304; F05D 2250/71
See application file for complete search history.

(56) References Cited

U.S. PATENT DOCUMENTS

| 3,600,781 | A | 8/1971 | Scott et al. |
|---|---|---|---|
| 6,478,539 | B1 | 11/2002 | Trutschel et al. |
| 7,220,100 | B2 * | 5/2007 | Lee .......... F01D 5/143 416/193 A |
| 8,100,655 | B2 | 1/2012 | Stone et al. |
| 8,684,680 | B2 * | 4/2014 | Martin .......... F01D 11/08 415/173.1 |
| 9,004,865 | B2 | 4/2015 | Guimbard et al. |
| 9,863,252 | B2 | 1/2018 | Merlot et al. |
| 10,844,726 | B2 | 11/2020 | Horn et al. |
| 11,377,960 | B2 | 7/2022 | Hiernaux et al. |
| 11,415,010 | B1 * | 8/2022 | Chong ........... F01D 9/044 |
| 2003/0170124 | A1 | 9/2003 | Staubach et al. |
| 2005/0106030 | A1 * | 5/2005 | Bachofner ........ F04D 29/668 416/235 |
| 2009/0097982 | A1 | 4/2009 | Saindon et al. |

(Continued)

FOREIGN PATENT DOCUMENTS

| DE | 102017218886 A1 | 4/2019 |
|---|---|---|
| EP | 0943784 A1 | 9/1999 |

(Continued)

*Primary Examiner* — Juan G Flores
*Assistant Examiner* — Brian Christopher Delrue
(74) *Attorney, Agent, or Firm* — Davidson, Davidson & Kappel, LLC

(57) ABSTRACT

A curved contour of the lateral surface of a blade arrangement includes in at least one meridian section on mutually opposite sides of a blade airfoil an intersection point that is closer to the blade airfoil front edge, and an intersection point that is closer to the blade airfoil rear edge, and a best-fit line of least square distances from the curved contour. The curved contour includes first and/or the second contour section which meet specified conditions.

18 Claims, 1 Drawing Sheet

(56) References Cited

U.S. PATENT DOCUMENTS

| | | |
|---|---|---|
| 2010/0166558 A1 | 7/2010 | Siden et al. |
| 2011/0243748 A1* | 10/2011 | Tsifourdaris ............ F01D 5/141 |
| | | 416/223 A |
| 2011/0262279 A1* | 10/2011 | Marini .................... F01D 5/141 |
| | | 416/223 A |
| 2012/0051930 A1* | 3/2012 | Pandey ................... F01D 5/145 |
| | | 416/223 A |
| 2013/0101409 A1* | 4/2013 | Beeck ..................... F01D 5/141 |
| | | 415/208.2 |
| 2014/0301852 A1 | 10/2014 | Zscherp et al. |
| 2015/0176415 A1 | 6/2015 | Nucci et al. |
| 2016/0146012 A1* | 5/2016 | Warikoo ................. F01D 9/041 |
| | | 415/208.2 |
| 2016/0201469 A1* | 7/2016 | Lewis ..................... F01D 5/141 |
| | | 415/115 |
| 2016/0208614 A1* | 7/2016 | Potter ....................... F01D 5/02 |
| 2016/0208624 A1* | 7/2016 | Smith ....................... F01D 5/28 |
| 2016/0265551 A1* | 9/2016 | Bailey .................... F01D 5/141 |
| 2017/0089203 A1* | 3/2017 | Lohaus ................... F01D 5/147 |
| 2018/0119706 A1 | 5/2018 | Vogiatzis et al. |
| 2019/0120061 A1* | 4/2019 | Horn ....................... F01D 5/141 |
| 2022/0170380 A1* | 6/2022 | Poick .................... F04D 29/563 |

FOREIGN PATENT DOCUMENTS

| | | |
|---|---|---|
| EP | 3477049 A1 | 5/2019 |
| EP | 3064711 B1 | 2/2021 |
| FR | 2928172 A1 | 9/2009 |

* cited by examiner

GAS TURBINE BLADE ARRANGEMENT

This claims the benefit of German Patent Application DE 102021109844.0 filed on Apr. 19, 2021, the disclosure of which is hereby incorporated by reference herein.

The present invention relates to a blade arrangement for a gas turbine, in particular an aircraft engine gas turbine, the blade arrangement including a lateral surface for radially delimiting an annular space and at least one blade airfoil that is connected or integrally joined thereto, and a compressor stage or turbine stage and a gas turbine, in particular an aircraft engine gas turbine, that includes such a blade arrangement.

BACKGROUND

Stiffness jumps between thin blade airfoils and solid disks (disk bodies) may result in undesirable stress clusters or peaks. According to in-house practice of the applicant, these are reduced via fillets or transition radii or rounding radii, which, however, may adversely affect the aerodynamics in particular.

SUMMARY OF THE INVENTION

It is an object of the present invention to improve a gas turbine, preferably to reduce one or multiple of the abovementioned disadvantages.

The present invention provides a blade arrangement blade arrangement for a gas turbine, in particular an aircraft engine gas turbine, the blade arrangement including an in particular radially inner lateral surface (20) for radially delimiting an annular space; and at least one blade airfoil (1), in particular a rotor blade airfoil or a guide blade airfoil, that is connected or integrally joined thereto; a curved contour (21) of the lateral surface in at least one meridian section, in particular in at least two meridian sections, on mutually opposite sides of the blade airfoil including in each case an intersection point (Si) that is closer to the blade airfoil front edge, in particular closest to the blade airfoil front edge, and an intersection point (So) that is closer to the blade airfoil rear edge, in particular closest to the blade airfoil rear edge, with a best-fit line (g) of least square distances from the contour, at least one intermediate point (Z) on the blade airfoil side, situated between these two intersection points, that is at a maximum distance from this best-fit line, and a first contour section (21i) that is situated between a start of this contour on the front edge side and this intersection point that is closer to the blade airfoil front edge, and a second contour section (21o) that is situated between this intersection point closer to the blade airfoil rear edge and an end of this contour on the rear edge side; at least one of the following conditions being met: (I) the first contour section and the intermediate point are situated on mutually opposite sides of the best-fit line (g), and a maximum distance (hi) between the best-fit line and the first contour section is at least 45%, in particular at least 50%, and at most 120%, of a maximum airfoil thickness (t) in at least one profile section of the blade airfoil, and/or at least 80%, in particular at least 90%, and at most 250%, of a distance (hz) between the best-fit line and the intermediate point; and/or (II) the second contour section and the intermediate point are situated on mutually opposite sides of the best-fit line (g), and a maximum distance (ho) between the best-fit line and the second contour section is at least 45%, in particular at least 50%, and at most 150%, of a, in particular the, maximum airfoil thickness (t) in at least one profile section of the blade airfoil, and/or is at least 160%, in particular 175%, and at most 270%, of a or the distance (hz) between the best-fit line and the intermediate point; and/or (III) the first and/or second contour section(s) and the intermediate point are situated on mutually opposite sides of the best-fit line (g), and a or the distance (hz) between the best-fit line and the intermediate point is at least 20%, in particular 25%, and at most 100% of a, in particular the, maximum airfoil thickness (t) in at least one profile section of the blade airfoil.

According to one embodiment of the present invention, a blade arrangement for a gas turbine, in particular an aircraft engine gas turbine, in particular at least one blade arrangement of (the compressor stage or turbine stage for) a gas turbine, in particular an aircraft engine gas turbine, includes (in each case) a lateral surface that radially delimits an annular space, in particular an annular space through which a working medium of the gas turbine flows or which is provided, in particular configured or used, for this purpose.

In one embodiment, as is customary in the field, "axial" refers to a direction in parallel to a rotational axis or (main) machine axis of the gas turbine, a circumferential direction corresponding in particular to a rotational direction about this axis, and "radial" corresponding in particular to a direction perpendicular to the axial direction and the circumferential direction, in particular (pointing) away from the axis and/or along a coordinate axis that intersects the rotational axis or (main) machine axis of the gas turbine.

In one embodiment, the lateral surface is a radially inner lateral surface or delimits the annular space radially inwardly, and in another embodiment is a radially outer lateral surface or delimits the annular space radially outwardly.

Although the present invention is not limited thereto, it may be used particularly advantageously for radially inner lateral surfaces, in particular on account of the thermal, aerodynamic, and/or mechanical boundary conditions.

According to one embodiment of the present invention, the blade arrangement includes one or multiple blade airfoils, in particular rotor blade airfoils or guide blade airfoils, that are connected to or integrally formed on the lateral surface, in one embodiment in an integrally joined and/or undetachable manner.

Although the present invention is not limited thereto, it may be used particularly advantageously for integrally bladed rotors (bladed disks (BLISKs)) or lateral surfaces that include multiple rotor blade airfoils that are thus integrally formed or integrally joined or undetachably connected.

According to one embodiment of the present invention, the curved contour (in one embodiment, curving convexly or toward the blade airfoil) of the lateral surface in at least one meridian section, in one embodiment the curved contour of the lateral surface in at least one (first) meridian section on one side of the blade airfoil, which in the present case, without limiting generality, is referred to as the first contour, and the curved contour of the lateral surface in at least one (second) meridian section on an oppositely situated side of the blade airfoil in the circumferential direction, which in the present case, without limiting generality, is referred to as the second contour, i.e., the curved (first and second) contours of the lateral surface in at least two meridian sections on mutually opposite (in the circumferential direction) sides of the blade airfoil, (in each case) include an intersection point that is closer to the blade airfoil front edge, or in one embodiment closest to the blade airfoil front edge, and an intersection point that is closer to the blade airfoil rear edge, in one embodiment closest to the blade airfoil rear edge, with a best-fit line of least square distances from the (corresponding or respective, i.e., first or second) contour, at least one intermediate point, situated (axially) between these two intersection points, that is spaced apart at a (radial) maximum distance from the (corresponding or respective) best-fit line and (radially) situated on the side of the best-fit line or on the blade airfoil side facing the blade airfoil, which for a radially inner lateral surface is thus situated radially outwardly or above the best-fit line, and a contour section, which in one embodiment is contiguous or constant or continuous, and which in the present case, without limiting generality, is referred to as the first contour section, and is situated between a start of the (corresponding or respective, i.e., first or second) contour on the front edge side and the intersection point closer to the blade airfoil front edge or closest to the blade airfoil front edge, and a contour section, which in one embodiment is contiguous or constant or continuous, and which in the present case, without limiting generality, is referred to as the second contour section, and is situated between the intersection point closer to the blade airfoil rear edge or closest to the blade airfoil rear edge and an end of the (corresponding or respective, i.e., first or second) contour on the rear edge side.

In one embodiment, the (first and second) meridian section, as is customary in the field, is (in each case) a (flat) section that encompasses the axial direction or rotational axis or (main) machine axis of the gas turbine, and preferably does not intersect the (corresponding) blade airfoil. In one embodiment, the (first and second) meridian section or the (first and second) contour, to which reference is made here, is spaced apart from the blade airfoil, to which reference is made here, in the circumferential direction (in each case) by at most 25%, in particular at most 10%, and/or at least 1%, of a distance of the blade airfoil from a blade airfoil adjacent thereto in the circumferential direction. The present invention is particularly suited for such lateral surface regions or contours near the blade airfoil, in particular due to the mechanical loads, in particular stresses, there.

In one embodiment, as is customary in the field, the best-fit line is the straight line for which the squares of the (radial) distances between the straight line and the (points of the) contour are at a minimum, thus, in particular the linear regression line of (for) the contour. If the contour is described by the function f(x) along axial coordinate x, the best-fit line results as that straight line $a \cdot x + b$ for which $\int_{x1}^{x2} [f(x) - (a \cdot x + b)]^2 \, dx$ between contour start x1 and contour end x2 is at a minimum. By reference to the best-fit line, in one embodiment the space distribution or mass distribution or stress distribution may advantageously be taken into account.

In one embodiment, the best-fit line intersects the contour only once or twice, i.e., at the intersection point closer to the blade airfoil front edge or closest to the blade airfoil front edge or a straight section of the contour containing same, and/or at the intersection point closer to the blade airfoil rear edge or closest to the blade airfoil rear edge or a straight section of the contour containing same. In one embodiment, the aerodynamics and/or manufacture may thus be improved.

According to one embodiment of the present invention, the first contour section and the intermediate point are situated on mutually (radially) opposite sides of the best-fit line; i.e., in the case of a radially inner lateral surface, thus the first contour section is situated radially inside or below the best-fit line, and a maximum (radial) distance between the best-fit line and the first contour section is at least 45%, in particular at least 50%, and at most 120%, of a maximum airfoil thickness in at least one profile section of the blade airfoil, and/or at least 80%, in particular at least 90%, and at most 250%, of a (radial) distance between the best-fit line and the intermediate point.

Additionally or alternatively, according to one embodiment of the present invention the second contour section and the intermediate point are situated on mutually (radially) opposite sides of the best-fit line; i.e., in the case of a radially inner lateral surface, thus the second contour section is situated radially inside or below the best-fit line, and a maximum (radial) distance between the best-fit line and the second contour section is at least 45%, in particular at least 50%, and at most 150%, of a airfoil thickness, a maximum airfoil thickness in one embodiment of the above-mentioned airfoil thickness, in at least one profile section of the blade airfoil, and/or at least 160%, in particular 175%, and at most 270%, of a or the distance between the best-fit line and the intermediate point.

Additionally or alternatively, according to one embodiment of the present invention, a or the (radial) distance between the best-fit line and the intermediate point is at least 20%, in particular 25%, and at most 100%, of a airfoil thickness, a maximum airfoil thickness in one embodiment of the above-mentioned airfoil thickness, in at least one profile section of the blade airfoil, in addition the first contour section and the intermediate point being situated on mutually opposite sides of the best-fit line and/or the second contour section and the intermediate point being situated on mutually opposite sides of the best-fit line.

In one embodiment, a or the profile section, to which profile section or airfoil thickness thereof reference is made, is spaced apart from the lateral surface by at least 5%, in particular at least 10%, and/or at most 50%, in particular at most 25%, of a, in particular maximum, minimum, or average, (radial) height of the blade airfoil. By reference to such a profile section or airfoil thickness thereof, in one embodiment the stress distribution in the vicinity of the lateral surface may advantageously be taken into account.

In this way, via one or multiple of the above-mentioned three conditions concerning the first contour section, the second contour section, or the intermediate point, in one embodiment a locally depressed annular space in the area of the front or rear edge or a locally indented lateral surface in the area of the front or rear edge is implemented, and/or in particular a stress profile between the blade airfoil and the lateral surface is thus improved, and stress peaks are preferably reduced.

In this way, in one embodiment the reliability may be enhanced, and preferably crack initiation, in particular due to damage during operation, in particular due to collisions with obstacles (foreign object damage (FOD)) or during (de)installation, may be reduced and/or crack propagation behavior may be improved.

In one embodiment, the first contour section extends from the start of the contour on the front edge side, i.e., encompassing same, to the intersection point closest to the blade airfoil front edge, i.e., also encompassing same.

Additionally or alternatively, in one embodiment the first contour section extends from the start of the contour on the front edge side, i.e., encompassing same, over at least 10%, in particular 15%, and at most 50%, of a chord length of at least one profile section of the blade airfoil, in one embodiment of the profile section, reference being made to its maximum airfoil thickness for the maximum distance between the best-fit line and the first contour section.

Additionally or alternatively, in one embodiment the first contour section extends from the intersection point closest to the blade airfoil front edge, i.e., encompassing same, over at least 10%, in particular 15%, and at most 50%, of a chord length of at least one profile section of the blade airfoil, in one embodiment of the profile section, reference being made to its maximum airfoil thickness for the maximum distance between the best-fit line and the first contour section.

Additionally or alternatively, in one embodiment the second contour section extends from the intersection point closest to the blade airfoil rear edge, i.e., encompassing same, to the end of the contour on the rear edge side, i.e., encompassing same.

Additionally or alternatively, in one embodiment the second contour section extends from the end of the contour on the rear edge side, i.e., encompassing same, over at least 5% of a chord length of at least one profile section of the blade airfoil, in one embodiment of the profile section, reference being made to its maximum airfoil thickness for the maximum distance between the best-fit line and the second contour section.

Additionally or alternatively, in one embodiment the second contour section extends from the intersection point closest to the blade airfoil rear edge, i.e., encompassing same, over at least 5% of a chord length of at least one profile section of the blade airfoil, in one embodiment of the profile section, reference being made to its maximum airfoil thickness for the maximum distance between the best-fit line and the second contour section.

Due to such an annular space depression or such a lateral surface indentation, in one embodiment a stress profile between the blade airfoil and the lateral surface may be particularly advantageously improved, and stress peaks may preferably be reduced in a particularly advantageous manner, and in one embodiment thus particularly advantageously enhancing the reliability, preferably reducing crack initiation in a particularly advantageous manner and/or improving crack propagation behavior in a particularly advantageous manner.

In one embodiment, the blade arrangement includes a fillet or has a transition radius or rounding radius at the lateral surface-side end of the blade airfoil on its pressure side ("pressure-side fillet") and/or includes a fillet or has a transition radius or rounding radius at the lateral surface-side end of the blade airfoil on its suction side ("suction-side fillet"), a (local) radial distance between a fillet runout of the pressure-side fillet on the blade airfoil side and the curved (first or second) contour of the pressure-side (first or second) meridian section and/or a (local) radial distance between a fillet runout of the suction-side fillet on the blade airfoil side and the curved (second or first) contour of the suction-side (second or first) meridian section (in each case), in particular viewed axially or in the axial direction or with increasing distance or over the distance from the start of the contour on the front edge side, varying at most by 25% of a distance between the (corresponding or respective) best-fit line and the (corresponding or respective) intermediate point. In other words, in one embodiment the pressure-side and/or suction-side fillet runout follow(s) the (corresponding or respective) annular space depression or the (corresponding or respective) lateral surface indentation.

In this way, in one embodiment a stress profile between the blade airfoil and the lateral surface may be particularly advantageously improved, and stress peaks may preferably be reduced in a particularly advantageous manner, and in one embodiment thus particularly advantageously enhancing the reliability, preferably reducing crack initiation in a particularly advantageous manner and/or improving crack propagation behavior in a particularly advantageous manner.

In another embodiment, the blade arrangement includes a fillet or has a transition radius or rounding radius at the lateral surface-side end of the blade airfoil on its pressure side ("pressure-side fillet") and/or includes a fillet or has a transition radius or rounding radius at the lateral surface-side end of the blade airfoil on its suction side ("suction-side fillet"), a (local) radial distance between a fillet runout of the pressure-side fillet on the blade airfoil side and the (corresponding or respective) best-fit line and/or a (local) radial distance between a fillet runout of the suction-side fillet on the blade airfoil side and the (corresponding or respective) best-fit line (in each case), in particular viewed axially or in the axial direction or with increasing distance or over the distance from the start of the contour on the front edge side, varying at most by 25% of a distance between the (corresponding or respective) best-fit line and the (corresponding or respective) intermediate point.

In one embodiment the manufacture and/or aerodynamics may be improved in this way.

In one embodiment, the blade arrangement has a best-fit line that is inclined in the axial direction; i.e., the slope of the best-fit line is not equal to zero. Depending on whether the blade arrangement of a compressor stage or a turbine stage is provided, the slope of the best-fit line is positive or negative.

In one embodiment, the blade arrangement has a ratio of the maximum distances of the best-fit line to the two contour sections, according to which the maximum distance of the first contour section from the best-fit line is less than the maximum distance of the second contour section from the best-fit line.

In another embodiment, the blade arrangement has a ratio of the maximum distances of the best-fit line from the two contour sections, according to which the maximum distance of the first contour section from the best-fit line is greater than the maximum distance of the second contour section from the best-fit line.

In one embodiment, the blade arrangement includes a guide blade of a stator and a rotor blade of a rotor adjacent thereto, in particular downstream from or upstream from same, or encompasses same, the guide blade and the rotor blade including blade airfoils as described above but which are different from one another, the slope of the best-fit line of the guide blade being greater than the slope of the best-fit line of the rotor blade. In particular, if the upstream rotor blade or guide blade has a lower slope than the other downstream rotor blade or guide blade, a low-loss transition along the two blades is provided in a particularly simple manner, at the same time the further advantages of the present invention, such as a basic stress reduction in the component and improved crack propagation behavior, being maintained.

The present invention, in particular on account of the thermal, aerodynamic, and/or mechanical boundary conditions, may be used with particular advantage for compressor stages and/or aircraft engine gas turbines, without the present invention being limited thereto.

BRIEF DESCRIPTION OF THE DRAWINGS

Further advantageous refinements of the present invention result from the subclaims and the following description of preferred embodiments. The figures show the following in a partially schematic manner:

DETAILED DESCRIPTION

Figure 1:
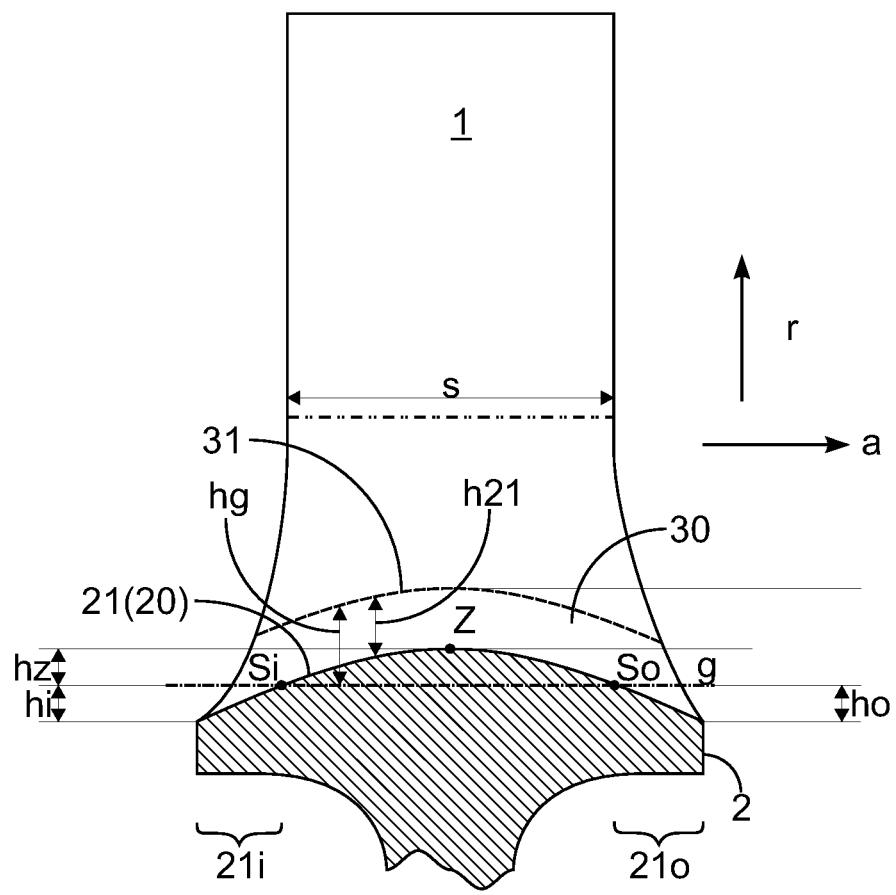
FIG. 1 shows a meridian section of a portion of a blade arrangement according to one embodiment of the present invention, together with a blade airfoil.

FIG. 1 shows a meridian section of a portion of a blade arrangement according to one embodiment of the present invention, together with a blade airfoil 1. FIG. 1 also shows a pressure side or suction side of blade airfoil 1, in one embodiment a meridian section being analogously formed on the opposite side of blade airfoil 1 in the circumferential direction and likewise meeting the conditions explained here.

Reference symbol r denotes a radial direction, and reference symbol a denotes an axial direction.

Figure 2:
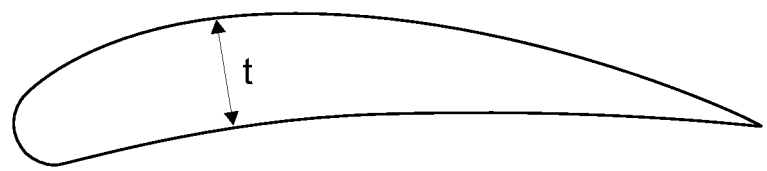
FIG. 2 shows a profile section of the blade airfoil.

FIG. 2 shows the profile section of blade airfoil 1, indicated by a dashed/double-dotted line in FIG. 1, with its/a maximum airfoil thickness t. Chord length s of the profile section is indicated in FIG. 1.

In the meridian section of FIG. 1, a radially inner lateral surface 20 of a disk or a disk body 2 of the illustrated blade arrangement includes a contour 21.

FIG. 1 illustrates best-fit line g of least square distances from contour 21 (dashed/dotted line in FIG. 1), intersection point Si, closest to the blade airfoil front edge, of contour 21 with this best-fit line g, intersection point So, closest to the blade airfoil rear edge, of contour 21 with this best-fit line g, and intermediate point Z, situated between these two intersection points Si, So, at the maximum distance from this best-fit line g on the blade airfoil side (at the top in FIG. 1). Correspondingly, the left blade airfoil edge in FIG. 1 is a front edge, and the right blade airfoil edge in FIG. 1 is a rear edge, of blade airfoil 1.

In addition, FIG. 1 shows a first contour section 21i that extends from the start of the contour 21 on the front edge side (on the left in FIG. 1) to intersection point Si closest to the blade airfoil front edge, and a second contour section 21o that extends from intersection point So, closest to the blade airfoil rear edge, to the end of contour 21 on the rear edge side (on the right in FIG. 1).

First contour section 21i and intermediate point Z are situated on radially opposite sides (below or above) best-fit line g, the same as for second contour section 21o and intermediate point Z.

Maximum distance hi between best-fit line g and first contour section 21i is at least 45%, in particular at least 50%, and at most 120%, of maximum airfoil thickness tin the profile section of FIG. 2, and/or at least 80%, in particular at least 90%, and at most 250%, of distance hz between best-fit line g and intermediate point Z.

Maximum distance ho between best-fit line g and second contour section 21o is likewise at least 45%, in particular at least 50%, and at most 150%, of maximum airfoil thickness tin the profile section of FIG. 2, and/or at least 160%, in particular 175%, and at most 270%, of distance hz between best-fit line g and intermediate point Z.

This distance hz between best-fit line g and intermediate point Z is at least 20%, in particular 25%, and at most 100%, of maximum airfoil thickness tin the profile section of FIG. 2.

In one modification, one or two of the three conditions mentioned above are not met.

In FIG. 1, a dashed line depicts a fillet runout 31 of a fillet 30 of the end of blade airfoil 1 at the lateral surface side, which essentially follows the above-described annular space depression or the above-described lateral surface indentation, so that a radial distance h21 between fillet runout 31 and curved contour 21 varies at most by 25% of distance hz between best-fit line g and intermediate point Z.

In contrast, in one modification, fillet runout 31 does not follow the annular space depression or the lateral surface indentation to the same extent described above. Instead, a radial distance hg between fillet runout 31 and best-fit line g varies at most by 25% of distance hz between best-fit line g and intermediate point Z.

Although exemplary embodiments have been explained in the preceding description, it is pointed out that numerous modifications are possible. It is further pointed out that the exemplary embodiments are merely examples which are in no way intended to limit the scope of protection, the applications, or the design. Rather, the preceding description provides those skilled in the art with guidelines for implementing at least one exemplary embodiment, it being possible to make various changes, in particular with regard to the function and arrangement of the described components, without departing from the scope of protection resulting from the claims and these equivalent feature combinations.

LIST OF REFERENCE SYMBOLS 1 blade airfoil
2 disk/disk body
20 lateral surface
21 contour
21i first contour section
21o second contour section
30 fillet
31 fillet runout
a axial direction
g best-fit line
hi maximum radial distance (21i, g)
ho maximum radial distance (21o, g)
hz radial distance (g, Z)
h21 radial distance (21, 31)
hg radial distance (g, 31)
r radial direction
s chord length
Si intersection point closest to the blade airfoil front edge (g, 21)
So intersection point closest to the blade airfoil rear edge (g, 21)
t maximum airfoil thickness
Z intermediate point

What is claimed is:

1. A blade arrangement for a gas turbine, the blade arrangement including
an radially inner lateral surface for radially delimiting an annular space; and
at least one blade airfoil, that is connected or integrally joined thereto;
a curved contour of the lateral surface in at least one meridian section, on mutually opposite sides of the blade airfoil, including in each casean intersection point (Si) that is closer to the blade airfoil front edge, and an intersection point (So) that is closer to the blade airfoil rear edge, and a best-fit line (g) of least square distances from the curved contour,
at least one intermediate point (Z) on the blade airfoil side, situated between these two intersection points (Si, So), that is at a maximum distance from this best-fit line, and where the curved contour includes a first contour section that is situated between a start of the curved contour on the front edge side and the intersection point (Si) that is closer to the blade airfoil front edge, and a second contour section that is situated between the intersection point (So) closer to the blade airfoil rear edge and an end of the curved contour on the rear edge side;

at least one of the following conditions being met:

(I) the first contour section and the intermediate point (Si) are situated on mutually opposite sides of the best-fit line (g), and a maximum distance (hi) between the best-fit line and the first contour section is at least 45% and at most 120%, of a maximum airfoil thickness (t) in at least one profile section of the blade airfoil, and/or at least 80% and at most 250%, of a distance (hz) between the best-fit line and the intermediate point; and/or (II) the second contour section and the intermediate point are situated on mutually opposite sides of the best-fit line (g), and a maximum distance (ho) between the best-fit line and the second contour section is at least 45% and at most 150%, of a maximum airfoil thickness (t) in at least one profile section of the blade airfoil, and/or is at least 160% and at most 270%, of a distance (hz) between the best-fit line and the intermediate point; and/or (III) the first and/or second contour section(s) and the intermediate point are situated on mutually opposite sides of the best-fit line (g), and a distance (hz) between the best-fit line and the intermediate point is at least 20%, and at most 100% of a maximum airfoil thickness (t) in at least one profile section of the blade airfoil.

2. The blade arrangement as recited in claim 1, wherein the first contour section extends from the start of the contour on the front edge side to the intersection point (Si) closest to the blade airfoil front edge, and/or from the start of the contour on the front edge side and/or the intersection point (Si) closest to the blade airfoil front edge, over at least 10% and at most 50%, of a chord length (s) of at least one profile section of the blade airfoil, and/or the second contour section extends from the intersection point closest to the blade airfoil rear edge to the end of the contour on the rear edge side, and/or from the end of the contour on the rear edge side end and/or the intersection point closest to the blade airfoil rear edge, over at least 5% and at most 50%, of a chord length (s) of at least one profile section of the blade airfoil.

3. The blade arrangement as recited in claim 1, wherein a fillet (30) is at the end of the blade airfoil on the lateral surface side, a radial distance (h21; hg) between a fillet runout (31) on the blade airfoil side and the curved contour or the best-fit line varies at most by 25% of the distance (hz) between the best-fit line and the intermediate point.

4. The blade arrangement as recited in claim 1, wherein the best-fit line is inclined in the axial direction.

5. The blade arrangement as recited in claim 4, wherein the maximum distance of the first contour section (hi) from the best-fit line (g) is less than the maximum distance of the second contour section (ho) from the best-fit line (g).

6. The blade arrangement as recited in claim 4, wherein the maximum distance of the first contour section (hi) from the best-fit line (g) is greater than the maximum distance of the second contour section (ho) from the best-fit line (g).

7. The blade arrangement as recited in claim 1, wherein the blade arrangement includes a guide blade of a stator and a rotor blade of a rotor adjacent thereto, the guide blade and the rotor blade each including one of said at least one blade airfoil wherein a slope of the best-fit line of the guide blade is greater than the slope of the best-fit line of the rotor blade.

8. A compressor stage or turbine stage for a gas turbine, including at least one blade arrangement as recited in claim 1.

9. A gas turbine, including at least one compressor stage and/or at least one turbine stage as recited in claim 8.

10. An aircraft engine gas turbine, including at least one compressor stage and/or at least one turbine stage as recited in claim 8.

11. The blade arrangement of claim 1, wherein the at least one blade airfoil is a rotor blade airfoil or a guide blade airfoil.

12. The blade arrangement of claim 1, wherein the at least one meridian section includes at least two meridian sections.

13. The blade arrangement of claim 1, wherein the intersection point (Si) is a point that is closest to the blade airfoil front edge.

14. The blade arrangement of claim 1, wherein the intersection point (So) is a point that is closest to the blade airfoil rear edge.

15. The blade arrangement of claim 1, wherein, in II, the maximum distance (hi) between the best-fit line and the first contour section is at at least 50% and at most 150%, of the maximum airfoil thickness (t), and/or is at least 175%, and at most 270%, of the distance (hz) between the best-fit line and the intermediate point.

16. The blade arrangement of claim 1, wherein, in (III) the distance (hz) between the best-fit line and the intermediate point is at least 25% and at most 100% of the maximum airfoil thickness (t) in at least one profile section of the blade airfoil.

17. The blade arrangement of claim 2, wherein the first contour section extends over at least 15% and at most 50%, of the chord length (s) of at least one profile section of the blade airfoil, and/or the second contour section extends over at least 10% and at most 50% of the chord length (s) of at least one profile section of the blade airfoil.

18. The blade arrangement as recited in claim 1, wherein a slope of the best-fit line is not equal to zero.

* * * * *